United States Patent [19]

Brown

[11] Patent Number: 4,857,095

[45] Date of Patent: Aug. 15, 1989

[54] METHOD FOR FORMING A FLUORINE-DOPED TIN OXIDE COATING ON A GLASS SUBSTRATE

[75] Inventor: Franklin I. Brown, Riverview, Mich.

[73] Assignee: Ford Motor Company, Dearborn, Mich.

[21] Appl. No.: 83,480

[22] Filed: Aug. 10, 1987

[51] Int. Cl.$^4$ ............................................. C03C 17/28
[52] U.S. Cl. .................................. 65/60.3; 65/60.52; 65/DIG. 16; 427/165; 427/166; 427/160
[58] Field of Search ..................... 65/60.3, 60.5, 60.51, 65/60.52, DIG. 16; 427/163, 165, 166, 167

[56] References Cited

U.S. PATENT DOCUMENTS

| | | | |
|---|---|---|---|
| 4,113,507 | 9/1978 | McHenry et al. | 427/166 |
| 4,140,814 | 2/1979 | Hynecek | 427/166 |
| 4,252,838 | 2/1981 | Boord et al. | 427/166 |
| 4,547,400 | 10/1985 | Middleton et al. | 427/166 |
| 4,590,096 | 5/1986 | Lindner | 427/166 |
| 4,696,837 | 9/1987 | Lindner | 65/60.52 |

FOREIGN PATENT DOCUMENTS 0103511  3/1984  European Pat. Off. ........... 65/60.52
0112780  7/1984  European Pat. Off. ........... 65/60.52

Primary Examiner—Arthur Kellogg
Attorney, Agent, or Firm—Roger L. May; Lorraine S. Melotik

[57] ABSTRACT

There is disclosed herein a method of making a glass substrate coated with an adherent, doped, tin oxide coating and article produced thereby. The glass substrate is heated to a spraying temperature which is sufficiently hot so that a heat decomposable, tin-containing material coming into the vicinity of the glass substrate will be heat decomposed permitting the tin contained in the tin-containing material to be oxidized and deposited as a doped tin oxide. The tin-containing material is applied in an oxygen ambient and is a material which contains both dibutyltin dibutoxide and trifluoroacetic acid. The preferred heating and application steps are undertaken under conditions that the spraying temperature and the ratio of milliliters of dibutyltin dibutoxide to milliliters of trifluoroacetic acid contained in the tin-containing material fall at some point located on or within the island area designated by the letter A in the map of these variables as set forth in FIG. 1 of the drawings.

3 Claims, 1 Drawing Sheet

METHOD FOR FORMING A FLUORINE-DOPED TIN OXIDE COATING ON A GLASS SUBSTRATE

TECHNICAL FIELD

This disclosure is directed to a method for forming an adherent, fluorine-doped, tin oxide coating on a selected surface of a glass substrate and article produced thereby. The coated glass substrate is manufactured by applying a coating material containing dibutyltin dibutoxide and trifluoroacetic acid to a heated surface of the glass substrate to form an adherent tin oxide coating thereon. The coating material is applied under conditions in which the ratio of dibutyltin dibutoxide to trifluoroacetic acid is controlled within certain ranges and the temperature to which the selected surface of the glass substrate is heated is also controlled within certain temperature ranges. The so-coated glass substrate may be formed into a low emissivity glass product. Such products are used, because they reflect infrared radiation, in architectural products such as windows in buildings and homes.

BACKGROUND AND PRIOR ART STATEMENT

There is available in the market today glass substrates, such as large glass windows, which have a tin oxide coating on a selected surface thereof. The purpose of the tin oxide coating is to improve the emissivity value of the window over that emissivity value which it would have without a coating thereon. Normally, the emissivity value of a glass substrate, such as a window, is improved by the application of a tin oxide coating thereto. Generally it may be said that a body having an emissivity value of 1.0 would pass all incident infrared radiation therethrough while a body having an emissivity value of 0 would reflect all incident infrared radiation. A clear glass window having a thickness of ⅛ inch has an emissivity value of 0.84, whereas such a glass window coated with a tin oxide coating would have an emissivity value in a range of 0.50–0.35.

The lower the emissivity value, the better the coated glass substrate is in reflecting infrared radiation. For example, if such a coated glass substrate is glazed into a window, the coating is effective in reflecting back into a building the infrared radiation produced within the building as, for example, by means of a fuel burning furnace. Most of such infrared radiation would normally pass through an uncoated window, but will have a large proportion thereof reflected back into the building by a properly coated glass window.

This disclosure teaches the selection of a particular heat decomposable, organic, tin-containing material for providing the tin which is oxidized to form a tin oxide coating on a selected surface of a glass substrate. The disclosure also teaches the use of a particular organic acid to provide a dopant for the tin oxide film which is being formed on the selected surface of the glass substrate. My invention is the discovery that if the ratio of the tin-supplying material to the dopant material is controlled within certain ratios, and the temperature of the selected surface of the glass substrate is controlled at a temperature within a certain temperature range, the best emissivity characteristics will be obtained from the doped tin oxide coating on the selected surface of the glass substrate that can be achieved by a reaction of the particular reactant materials I have selected.

The organic, heat decomposable, tin-containing material that I have selected is dibutyltin dibutoxide and the doping material that I have selected is trifluoroacetic acid. These materials have been selected as they form a very clean coating of doped tin oxide on a heated glass substrate by a pyrolytic decomposition process. In such a pyrolytic process, a tin oxide coating is developed on a selected surface of a glass substrate by application of a coating material to a heated glass substrate. Selected chemical materials can be sprayed in a dissolved form against the selected surface of the heated glass substrate in an oxidizing atmosphere. The so-sprayed materials coming into the vicinity of and/or contact with the selected surface of the glass substrate will be heat decomposed permitting the tin contained in the tin-containing material and the dopant therefor to be oxidized and deposited as a doped tin oxide coating on the selected surface of the glass substrate.

It is the primary object of this invention to provide a method of achieving the best emissivity characteristics from the reaction of certain materials used to produce doped tin oxide coatings on selected surfaces of glass substrates. The particular reactant materials which I have selected have not been commercially used as far as I am aware for the purpose of achieving doped tin oxide coatings on glass substrates.

I have filed on even date herewith an application entitled "Glass Substrate Coated with Tin Oxide and Method of Making Same", which has been assigned Ser. No. 083,479. This application is hereby incorporated by reference.

BRIEF DESCRIPTION OF THE DISCLOSURE

This disclosure teaches a method for forming an adherent, fluorine-doped, tin oxide coating on a selected surface of a glass substrate. The disclosure also teaches a new article of manufacture produced by such a method.

The method for forming an adherent, fluorine-doped, tin oxide coating on a selected surface of a glass substrate in accordance with this disclosure has the following steps. A selected surface of the glass substrate is heated to a spraying temperature which is sufficiently hot so that a tin-containing spray material coming into the vicinity of and/or contact with the selected surface will be heat decomposed permitting the tin and dopant material contained in the tin-containing spray material to be oxidized and deposited as a doped tin oxide coating on the selected surface. The tin-containing spray material is applied to the heated surface of the glass substrate in an oxygen ambient. The preferred tin-containing spray material is a solution of dibutyltin dibutoxide $[(C_4H_9)_2Sn(OC_4H_9)_2]$ and trifluoroacetic acid $[CF_3COOH]$.

In accordance with the teachings of this invention, the heating and application steps are undertaken under conditions (I) that the spraying temperature to which the selected surface of the glass substrate is heated prior to application of the tin-containing spray material thereto, and (II) that the ratio of milliliters of trifluoroacetic acid per milliliters of dibutyltin dibutoxide contained in the tin-containing spray material fall at some point located on or within the island area designated by the letter A in the map of these variables as set forth in FIG. 1.

In a broader embodiment of the method of this invention, the heating and application steps are undertaken under the following conditions. The spraying temperature to which the selected surface of the glass substrate is heated prior to application of the tin-containing material thereto is in a temperature range from about 1065° F. to about 1100° F. Also, the ratios of milliliters of trifluoroacetic acid to milliliters of dibutyltin dibutoxide in the tin-containing material is in a range from about 0.060 to about 0.170.

This disclosure also teaches, as an invention, a new article of manufacture which is a coated glass substrate made by the above described methods. The new article of manufacture is a glass substrate having a doped tin oxide coating on a selected surface thereof. The coated glass substrate is manufactured by the following process. A selected surface of the glass substrate is heated to a spraying temperature which is sufficiently hot to decompose a tin-containing spray material coming into the vicinity of and/or contact with the selected surface. This action permits the tin and dopant material contained in the tin-containing spray material to be oxidized and deposited as a doped tin oxide coating on the selected surface.

A tin-containing spray material is applied to the heated selected surface of the glass substrate in an oxygen ambient. The preferred tin-containing spray material is a solution of dibutyltin dibutoxide and trifluoroacetic acid.

The heating and the application steps to make the new article of manufacture are undertaken under conditions (I) that the spraying temperature to which the selected surface of the glass substrate is heated prior to application of the tin-containing spray material thereto, and (II) that the ratio of milliliters of trifluoroacetic acid to dibutyltin dibutoxide contained in the tin-containing spray material fall at some point located on or within the island area designated by the letter A in the map of these variables as set forth in FIG. 1.

In a broader embodiment of the new article of manufacture of this invention, the article is produced under conditions in which the selected surface of the glass substrate is heated to a temperature in a range from about 1065° F. to about 1100° F. The ratio of milliliters of trifluoroacetic acid to milliliters of dibutyltin dibutoxide in the tin-containing spray material is in a range from about 0.060 to about 0.170.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the data set forth in the accompanying drawing, in which:

BEST MODE AND INDUSTRIAL APPLICABILITY

Figure 1:
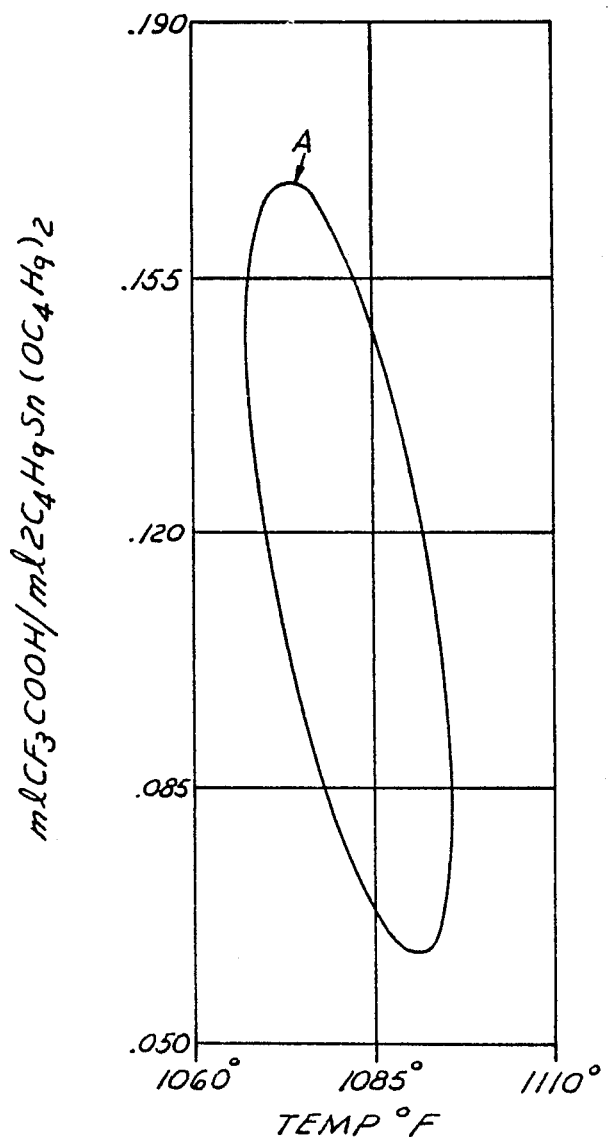
FIG. 1 is a map of the ratio of milliliters (ml's) of trifluoroacetic acid per milliliters of dibutyltin dibutoxide contained in a spraying material and the temperature in degrees farenheit to which the selected surface of the glass substrate is heated prior to spraying by the spraying material indicating on and within the island area designated by the letter A the combinations of these variables which will produce an optimum doped tin oxide coating as per the method of my invention which results in the new article of manufacture of my invention.

The following description is what I consider to be preferred embodiments of the methods of forming an adherent, fluorine-doped, tin oxide coating on a selected surface of a glass substrate and new articles of manufacture produced thereby in accordance with my inventions. The following description also sets forth what I now contemplate to be the best mode of carrying out the methods of my invention in order to produce the articles of manufacture of my invention. The description is not intended to be a limitation upon the broader principles of the methods of this invention or upon the articles of manufacture of this invention.

The doped tin oxide coating which is formed by a method of my invention is formed from two ingredients. The first ingredient is the tin-supplying component and the second ingredient is the dopant ion component. The tin-supplying component is dibutyltin dibutoxide $[(C_4H_9)_2Sn(OC_4H_9)_2]$. The dopant ion component is fluorine supplied from trifluoroacetic acid $[CF_3COOH]$.

The dibutyltin dibutoxide is selected as the tin-supplying component because of several reasons. First, it results in a very clear tin oxide coating. The coating formed by this material has a very low degree of haze in that it does not have any cloudy areas. Also, the dibutyltin dibutoxide forms a thicker tin oxide coating than is formed by other materials. The thicker coating formed by this material is also more uniform in thickness across the entire extent of the deposited coating.

The trifluoroacetic acid is selected as the fluorine-supplying dopant because this organic acid contains very little water, thus eliminating detrimental reactions which can occur if water vapor is present in the reaction system. Also, trifluoroacetic acid is a relatively inexpensive form of an organic acid which supplies fluorine.

When these preferred materials, in a controlled ratio to one another, are sprayed in a spray material on a substrate, the temperature of which is controlled within limits, these materials produce optimum results with respect to the emissivity characteristics of the adherent, fluorine-doped, tin oxide coating placed on the glass substrate. By optimum results, I mean that the emissivity value of tin oxide coating so-produced is at its lowest levels thereby producing the best possible coated glass for the purpose of keeping infrared radiation within a room as, for example, when such a coated glass substrate is used as a low emissivity glass window. The low emissivity values achieved generally are in a range below 0.40.

Additional reasons for selecting dibutyltin dibutoxide and trifluoroacetic acid are that the dibutyltin dibutoxide may be manufactured at a reasonable cost and is a material which is relatively easy to handle. Similarly, trifluoroacetic acid is a readily available organic acid and it acts as an excellent vehicle for dissolving the dibutyltin dibutoxide.

The two variables that I teach with respect to my invention in order to achieve an adherent, optimum-doped, tin oxide coating on a glass substrate are the temperature to which the glass substrate is heated and the composition of the spray material of dibutyltin dibutoxide and trifluoroacetic acid which is sprayed onto the selected surface of the glass substrate.

With respect to these variables, reference is hereby made to FIG. 1. Along the horizontal axis of FIG. 1 there is plotted in degrees farenheit the temperature to which the selected surface of the glass substrate should be heated for application of a coating material. Along the vertical axis there is plotted the volumetric ratio of milliliters of trifluoroacetic acid per milliliters of dibutyltin dibutoxide forming a particular spraying material. The results of my experimentation have resulted in FIG. 1 which provides a map of these variables in which an island area, designated by the letter A, is shown. According to the teachings of my invention, if the heated temperature of the selected surface of the glass substrate and the ratio of milliliters of trifluoroacetic acid to dibutyltin dibutoxide fall at some point on or within the island area enclosed in the map of these variables shown in FIG. 1 and designated by the letter A, the optimum emissivity results will be achieved for the adherent coating from the coating materials which have been applied to the surface of the glass substrate. The optimum results are achieved regardless of the thickness of the glass substrate.

Thus, in order to use the teachings of a method of my invention to produce an article of manufacture in accordance with still further teachings of my invention, one may first select, for example, a particular ratio of materials to be sprayed. For example, if the ratio of 0.120 of milliliters of trifluoroacetic acid to milliliters of dibutyltin dibutoxide in the spraying material is selected for a particular spraying material, then the island area "A" of FIG. 1 would indicate that the temperature of the selected surface of the glass substrate at the time of spraying should be in a range of from about 1070° F. to about 1092° F. in order to achieve an adherent coating of tin oxide having the best emissivity value which can be achieved by use of these two materials.

As an alternate embodiment of the method of my invention, one may control the temperature of the selected surface of the substrate and work with a spraying material, the concentration of which would be the variable. In such a case, one selects a temperature, for example, 1085° F., for the temperature to which the selected surface of the glass substrate is heated. In that case, the ratio of milliliters of trifluoroacetic acid to milliliters of dibutyltin dibutoxide in the spraying solution could vary from a low of from about 0.0690 to a high of about 0.1475. Of course, most operators would not operate at these outside limits, but rather would attempt to define the middle position which would be a ratio of about 0.100 for the particular temperature selected.

It would be my suggestion to control the ratio of milliliters of trifluoroacetic acid to milliliters of dibutyltin dibutoxide in the spraying material and adjust the temperature of the selected surface of the glass substrate to be sprayed in order to optimize the emissivity characteristics of the doped tin oxide coating on the glass substrates produced thereby.

While particular embodiments of the invention have been illustrated and described, it will be obvious to those skilled in the art that various changes and modifications may be made without departing from the invention. It is intended to cover in the appended claims all such modifications and equivalents as fall within the true spirit and scope of this invention.

I claim:

1. A method for forming an adherent, fluorine-doped, tin oxide coating on a selected surface of a glass substrate, which comprises the steps of:
   heating said selected surface of said glass substrate to a spraying temperature which is sufficiently hot so that a heat decomposable, tin-containing material coming into the vicinity of and/or contact with said selected surface will be heat decomposed permitting said tin contained in said tin-containing material to be oxidized and deposited as tin oxide on said selected surface; and
   in an oxygen ambient, applying to said heated selected surface of said glass substrate as said tin-containing spray material a solution of dibutyltin dibutoxide [$(C_4H_9)_2Sn(OC_4H_9)_2$] and trifluoroacetic acid [$CF_3COOH$];
   said heating and application steps being undertaken under conditions (I) that said spraying temperature to which said selected surface of said glass substrate is heated prior to application of said tin-containing spray material thereto, and (II) that the ratio of milliliters of trifluoroacetic acid to milliliters of dibutyltin dibutoxide contained in said tin-containing spray material fall at some point located on or within the island area designated by the letter A in the map of these variables as set forth in FIG. 1.

2. A method for forming an adherent, fluorine-doped, tin oxide coating on a selected surface of a glass substrate, which comprises the steps of:
   heating said selected surface of said glass substrate to a spraying temperature which is sufficiently hot so that a heat decomposable, tin-containing material coming into the vicinity of and/or contact with said selected surface will be heat decomposed permitting said tin contained in said tin-containing material to be oxidized and deposited as tin oxide on said selected surface; and
   in an oxygen ambient, applying to said heated selected surface of said glass substrate as said tin-containing spray material a solution of dibutyltin dibutoxide [$(C_4H_9)_2Sn(OC_4H_9)_2$] and trifluoroacetic acid [$CF_3COOH$];
   said heating and application steps being undertaken under conditions (I) that said spraying temperature is in a temperature range from about 1065° F. to about 1100° F., and (II) that the ratio of milliliters of trifluoroacetic acid to milliliters of dibutyltin dibutoxide in the tin-containing spray material is in a range from about 0.060 to about 0.170.

3. A method for forming an adherent, fluorine-doped, tin oxide coating on a selected surface of a glass substrate, which comprises the steps of:
   heating said selected surface of said glass substrate to a temperature which is sufficiently hot so that a heat decomposable, tin-containing material coming into the vicinity of and/or contact with said selected surface will be heat decomposed permitting said tin contained in said tin-containing material to be oxidized and deposited as tin oxide on said selected surface; and
   in an oxygen ambient, applying to said heated selected surface of said glass substrate as said tin-containing material a material containing a mixture of dibutyltin dibutoxide [$(C_4H_9)_2Sn(OC_4H_9)_2$] and trifluoroacetic acid [$CF_3COOH$];
   said glass substrate being heated to a temperature and the ratio of trifluoroacetic acid to dibutyltin dibutoxide in said material mixture being selected so that said adherent, fluorine-doped, tin oxide coating produced as a result of said application of said material mixture to said heated selected surface of said substrate will result in an adherent, doped, tin oxide coating having an emissivity value of 0.4 or less.

* * * * *